United States Patent
Kraus

(10) Patent No.: US 8,656,830 B2
(45) Date of Patent: Feb. 25, 2014

(54) METHOD AND APPARATUS FOR APPLYING PRESERVATIVE TO AGRICULTURAL BALES

(75) Inventor: Timothy J. Kraus, Blakesburg, IA (US)

(73) Assignee: Deere & Company, Moline, IL (US)

(*) Notice: Subject to any disclaimer, the term of this patent is extended or adjusted under 35 U.S.C. 154(b) by 440 days.

(21) Appl. No.: 12/608,273

(22) Filed: Oct. 29, 2009

(65) Prior Publication Data
US 2011/0099966 A1 May 5, 2011

(51) Int. Cl.
*B30B 13/00* (2006.01)
*A01F 15/08* (2006.01)

(52) U.S. Cl.
USPC .................. 100/35; 100/74; 100/88

(58) Field of Classification Search
USPC ............ 100/35, 70 R, 73, 74, 87, 88; 56/341, 56/343
See application file for complete search history.

(56) References Cited

U.S. PATENT DOCUMENTS

| 4,228,638 A | 10/1980 | Rabe et al. |
| 4,352,267 A * | 10/1982 | Mellinger ............... 56/341 |
| 4,453,460 A | 6/1984 | Rabe et al. |
| 4,459,798 A | 7/1984 | Penfold et al. |
| 4,627,338 A | 12/1986 | Sprott et al. |
| 4,916,888 A * | 4/1990 | Sheehan et al. ............. 56/14.7 |
| 4,918,910 A * | 4/1990 | Sheehan et al. ............. 56/341 |
| 7,340,996 B1 * | 3/2008 | Viaud ............... 100/88 |

* cited by examiner

*Primary Examiner* — Jimmy T Nguyen
(74) *Attorney, Agent, or Firm* — Quarles & Brady LLP

(57) ABSTRACT

A method and apparatus are provided for applying preservative to agricultural crops during baling. More particularly, a baler has a preservative application system and a bale size sensor. The preservative application system has a preservative storage container, a preservative transfer device and an applicator device. The preservative transfer device is in communication with both the storage container and the applicator device to transfer a preservative stored in the storage container to the applicator device. The bale size sensor is in communication with the transfer device so that the transfer device and therefore the application of preservative to the crop can be controlled in response to a bale size sensed by the bale size sensor.

11 Claims, 7 Drawing Sheets

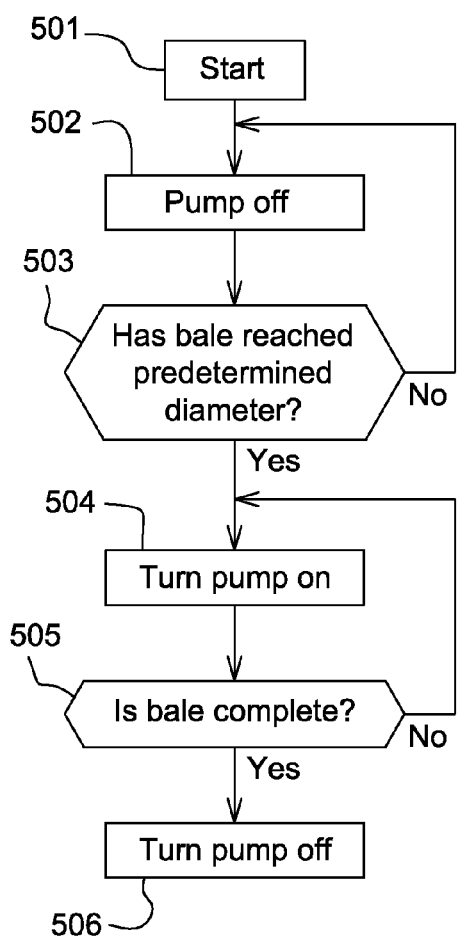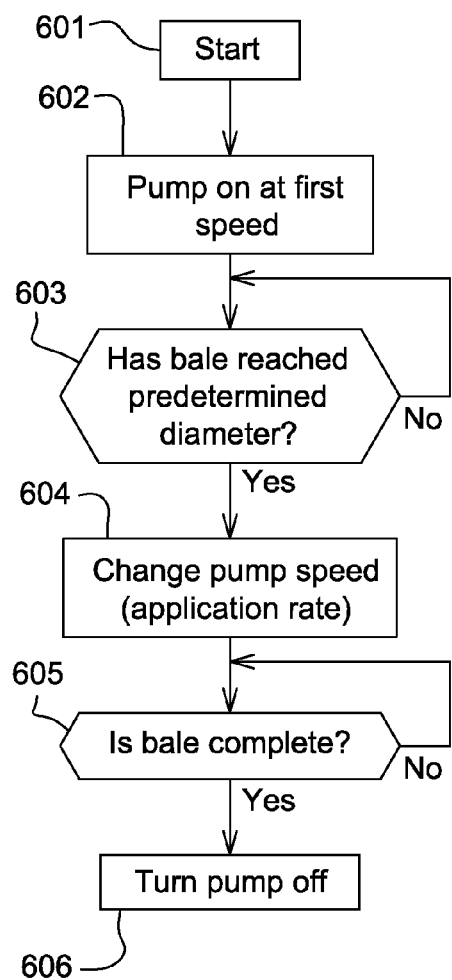
Fig. 5
Fig. 6

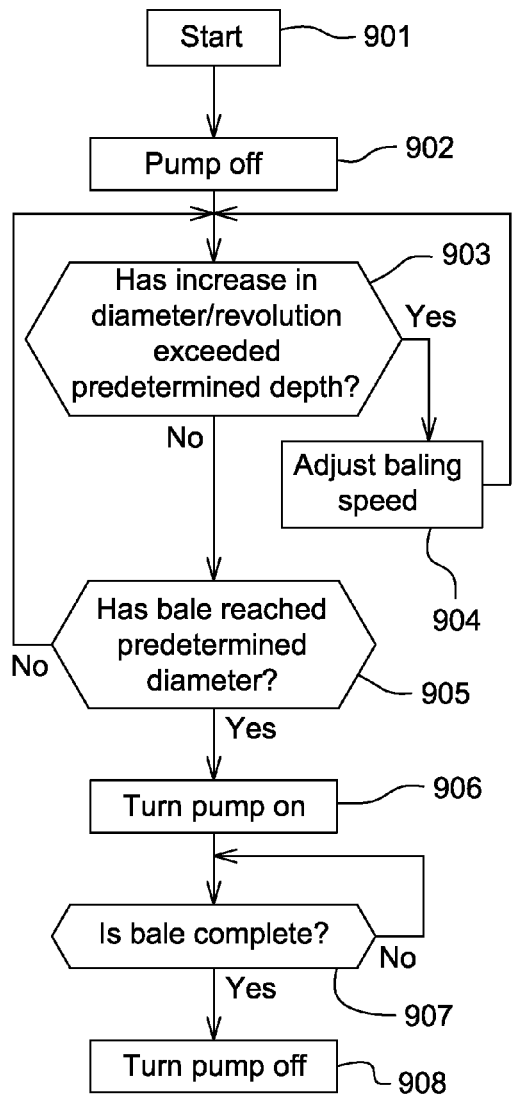
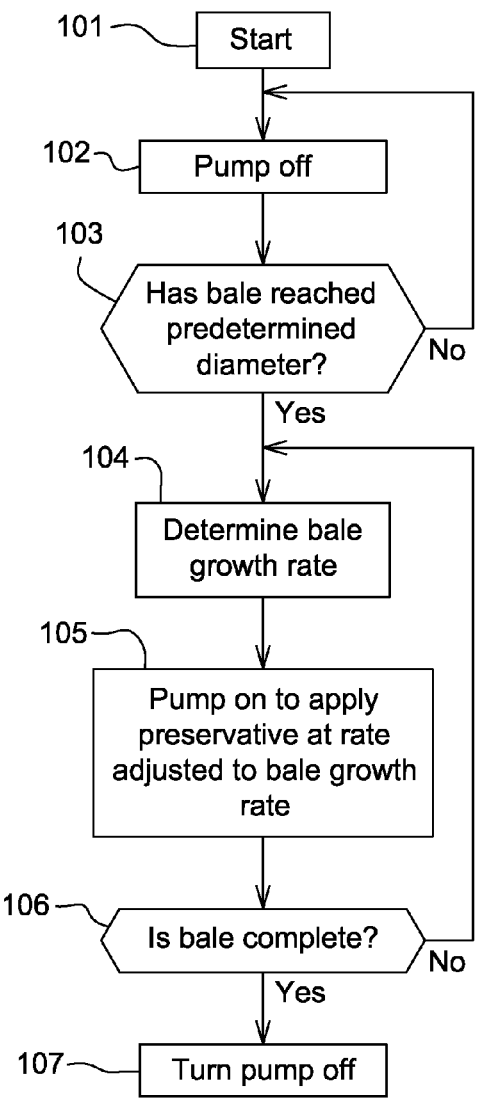
Fig. 9
Fig. 10

METHOD AND APPARATUS FOR APPLYING PRESERVATIVE TO AGRICULTURAL BALES

FIELD OF THE INVENTION

The present invention relates to machines for forming cylindrical bales of crop material, such as hay, and particularly to an improved means for applying a preservative to the crop material as the bale is being formed.

BACKGROUND OF THE INVENTION

In agriculture it is a well known practice to bale crop material using balers that create round or cylindrical bales. It is also a common practice to store such bales outdoors where they are exposed to the elements of rain and snow. Nearly all, round bales stored outside without some form of protection from rain and/or snow will experience mold growth in the outer rind of the bale. The depth to which the mold appears is dependent on many factors but the one critical factor is the depth to which water penetrates the baled crop.

The potential benefits of applying mold inhibiting preservatives to hay either during a baling process or to the finished bale are well known and include (a) permitting the hay to be baled and stored at higher moisture contents without spoilage, thus reducing field losses and making the hay making operation less dependent on favorable weather conditions; (b) improved palatability and digestibility; and (c) higher nutrient content. The relative importance of these benefits varies with the crop being treated and the preservative used.

Accordingly, preparations of buffered propionic acid or anhydrous ammonia are sometimes applied to the hay at the time of baling to prevent bacterial and mold growth. Typically, these preparations are applied to the entire bale as it is being formed or injected into the bale after formation. The problem with using such preservatives is that they can be corrosive, difficult to apply, and evaporate with time with the result that their effectiveness is diminished.

Recently new preservatives have been developed that are less volatile and more stabile than propionic acid or anhydrous ammonia. The problem is that these new proprietary preservatives can be costly to apply to the entire bale. Because of this, there is a desire to apply the preservative only to the outer rind of the bale to a predetermined depth, so as to assure that the outer rind of the bale is adequately treated while still conserving costly preservative preparations.

SUMMARY OF THE INVENTION

It is therefore an object of the invention to provide a method and apparatus for applying a preservative to a bale as the bale is being formed in the bale forming chamber of a baler.

It is another object of the invention to provide a method and apparatus for applying at least one preservative to a bale at a controlled rate based upon the diameter of the bale as it is being formed.

It is still another object of the invention to enable the application of preservative to a bale to a prescribed depth comprising the outer rind of the bale.

It is yet another object of the invention to provide a method and apparatus for applying more than one preservative to a bale.

These and other objects of the invention are accomplished by a baler having a preservative application system and a bale size sensor, the preservative application system comprising at least one preservative storage container, at least one preservative transfer device and at least one applicator device, the at least one preservative transfer device being in communication with both the at least one storage container and the at least one applicator device to transfer a preservative stored in the at least one storage container to the applicator device, the bale size sensor being in communication with the at least one transfer device wherein the at least one transfer device is actuated in response to a bale size as sensed by the bale size sensor.

The objects of the invention are further accomplished by a method of applying a preservative preparation to an agricultural crop during a baling process using a baler having a preservative application system and a bale size sensor, the method comprising the steps of: commencing a bale forming process; monitoring a bale size during the bale forming process utilizing the bale size sensor; and, controlling application of a preservative to the crop by the preservative application system in response to a sensed bale size determined by the bale size sensor.

In general a method and apparatus are provided for applying preservative to agricultural crops during baling. More particularly, a baler has a preservative application system and a bale size sensor. The preservative application system has a preservative storage container, a preservative transfer device and an applicator device. The preservative transfer device is in communication with both the storage container and the applicator device to transfer a preservative stored in the storage container to the applicator device. The bale size sensor is in communication with the transfer device so that the transfer device and therefore the application of preservative to the crop can be controlled in response to a bale size sensed by the bale size sensor.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

FIG. 5 is a flowchart showing the logic of a first embodiment of the method;

FIG. 6 is a flowchart showing the logic of another embodiment of the method;

FIG. 9 is a flowchart showing the logic of yet another embodiment of the method; and, FIG. 10 is a flowchart showing the logic of yet another embodiment of the method.

DESCRIPTION OF THE PREFERRED EMBODIMENT

Figure 1:
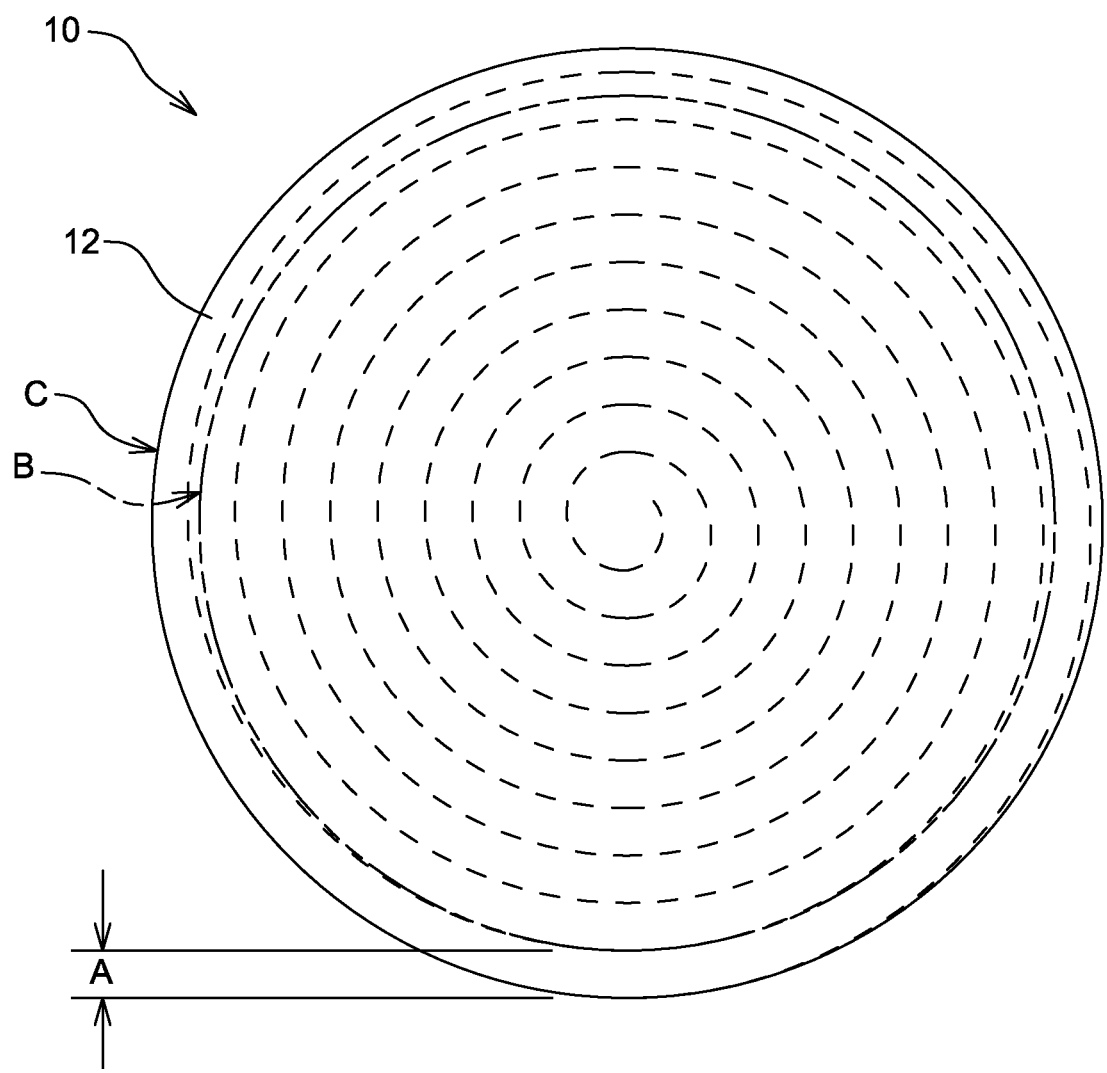
FIG. 1 is an elevational side view of a representative cylindrical crop bale.

In FIG. 1 is illustrated an agricultural crop bale 10 that has been formed in a round baler. As will be described further below such balers pick up crop material from the ground and roll it up in a continuous spiral to form the bale 10. As illustrated, each such crop bale will have an outer rind about the bale's outer circumference. As used herein the term "outer rind" is defined as the layer of crop material near and including the circumferential surface of the bale 10 to a depth to which it has been determined that water from rain or snow would penetrate the bale, if the bale is stored outdoors.

In FIG. 1 the depth to which water is predicted to penetrate the bale 10 is indicated by the dimension A. Accordingly in FIG. 1 the outer rind 12 is illustrated as the area between the line B and the outer circumferential surface C of the bale 10. It will be recognized that the depth to which water might penetrate a bale is dependent on numerous variables including, but not limited to, the kind and condition of the crop material, and the density of the crop material in the bale.

Figure 2:
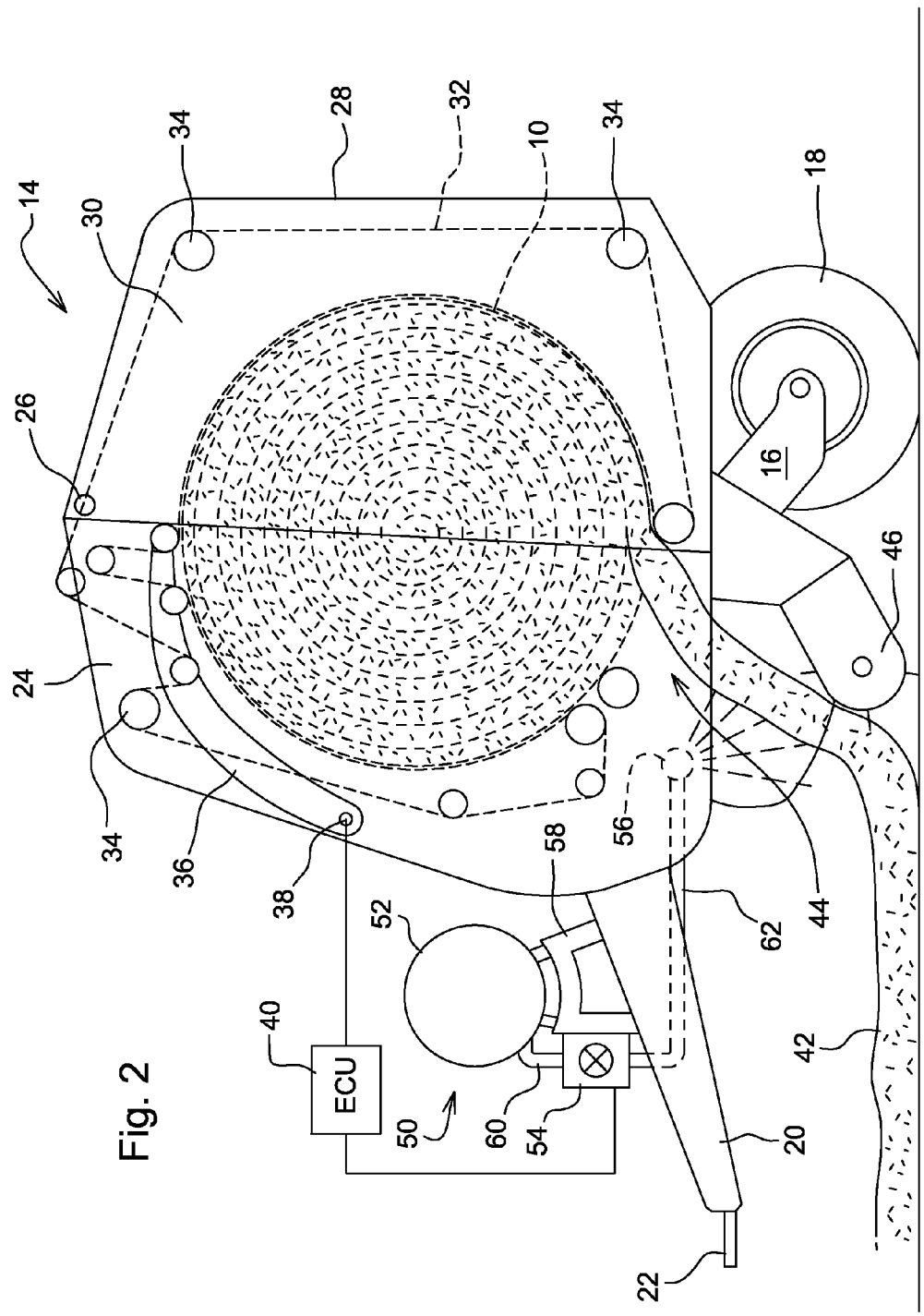
FIG. 2 is an elevational view of a round baler employing the apparatus according to the invention.
Figure 3:
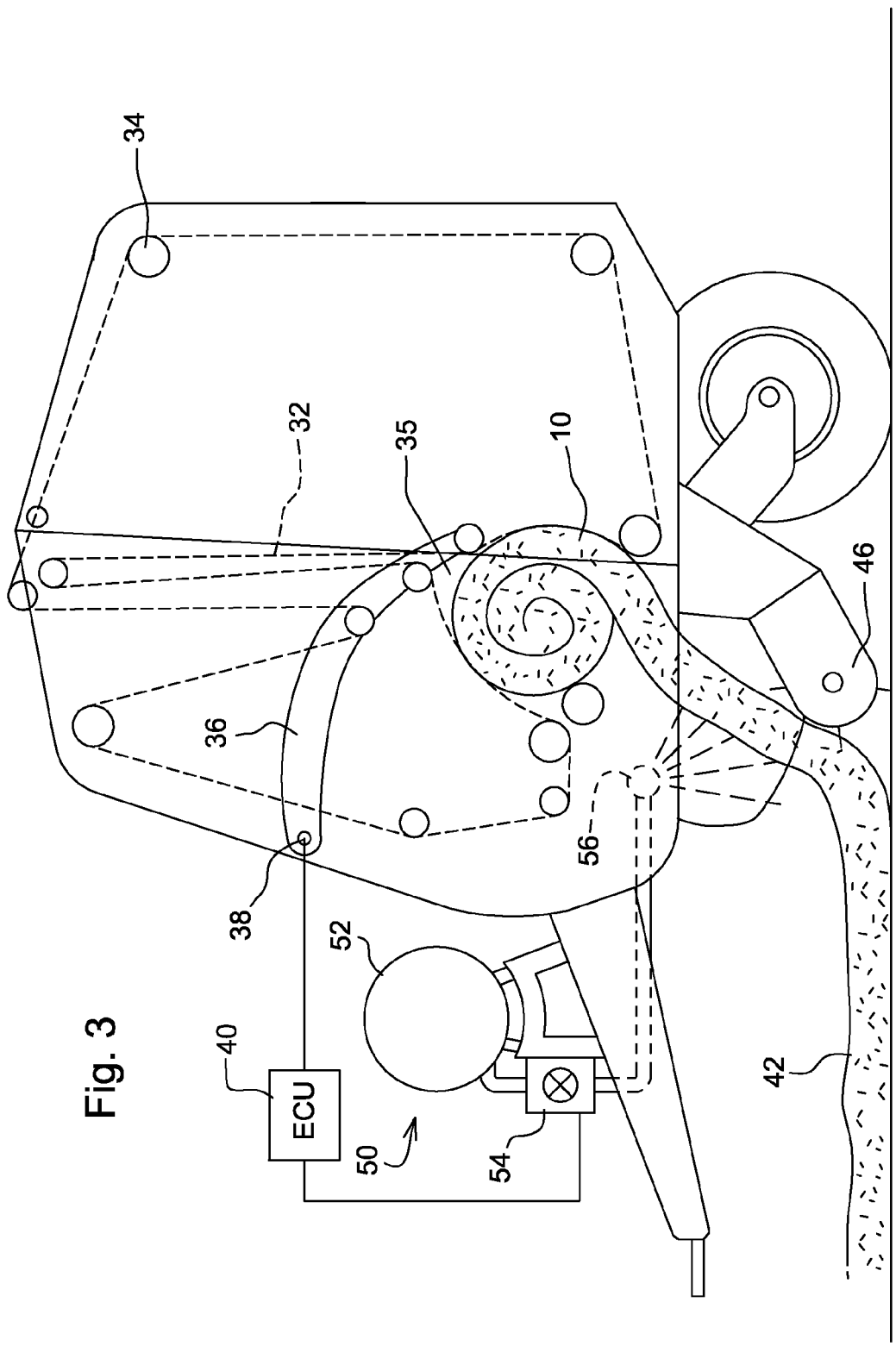
FIG. 3 is an elevational view of a round baler employing the apparatus according to the invention.

Referring now to FIGS. 2 and 3 it can be seen that a round baler is generally designated by the numeral 14. The baler 14 is in many respects conventional in its arrangement and includes a main frame 16 supported on a pair of ground wheels 18. A draft tongue 20 has a rear end joined to the frame 16 and has a forward end defined by a clevis arrangement 22 adapted for being coupled to a towing vehicle (not shown). A pair of upright side walls 24 are fixed to the main frame 16 and define forward regions of opposite side walls of a baling chamber. Mounted for pivoting vertically about a horizontal pivot arrangement 26 located at an upper rear location of the side walls 24 is a discharge gate 28 including opposite upright side walls 30, which define opposite sides of a rear region of the baling chamber. A gate cylinder arrangement (not shown) is coupled between the main frame 16 and the opposite side walls 30 of the discharge gate 28 and is selectively operable for moving the discharge gate 28 between a lowered baling position and an opened discharge position. Baler 14 is of a variable size chamber design and thus comprises a plurality of longitudinally extending side-by-side belts 32 supported on a plurality of rollers 34 (only a few of which are shown). A bale forming chamber is defined by the sidewalls 24, 30, the rollers 34 and belts 32.

As mentioned previously, the baler 14 illustrated is a variable chamber design wherein crop is rolled up in a spiral fashion in a nip 35 formed between oppositely moving adjacent loops of belts 32. The space between adjacent loops of belts 32 grows as the forming bale 10 grows larger. Accordingly, a belt tensioning device 36 is provided to take up slack in the belts 32 as needed. Thus the position of the tensioning device 36, at any given time, is an indication of the size of the bale 10 at that time. It will be noted here that the primary difference between FIGS. 2 and 3 is that FIG. 2 illustrates a nearly fully formed bale in the bale chamber while FIG. 3 illustrates a state wherein the bale is only partially formed. A bale diameter sensor 38 in the form of a potentiometer is affixed to the pivot point of the tensioning device 36 and thus provides an electrical signal correlating with bale diameter to an Electronic Control Unit (ECU) 40. The ECU 40, via appropriate logic, can then translate the signal into meaningful bale size data that can be communicated to an operator by way of an appropriate display device (not shown). In addition to providing an indication of bale size to the operator, the ECU 40 can be adapted to utilize bale diameter data for other purposes such as triggering a twine or wrapping cycle, opening the discharge gate, initiating bale discharge, or as a novel feature of the present invention, to control the application of preservative to the bale as will be described in further detail below. It is contemplated that the baler could be a fixed chamber design that would not employ a belt tensioning device. In such a baler or in an alternative embodiment of a variable chamber design it is possible to utilize numerous other sensor types for determining bale size or for simply determining whether the bale has reached a given size. For example various types of magnetic, capacitive, or optical sensors could be employed to detect bale size as well as both contact and non-contact sensors and/or mechanical switches.

In its general operation the baler 14 is drawn through a field by a prime mover (not shown) attached to the tongue 20. Crop material 42 is fed into a crop inlet 44 of the bale forming chamber from a windrow of crop on the ground by a pickup 46. In the baler 14, the crop material 42 is rolled in spiral fashion as described above into the cylindrical bale 10. Upon completion, the bale 10 is wrapped with twine or other appropriate wrapping material and is discharged by actuation of gate cylinders that open gate 28 permitting the completed bale 10 to be discharged from the baler 14 onto the ground.

Figure 4:
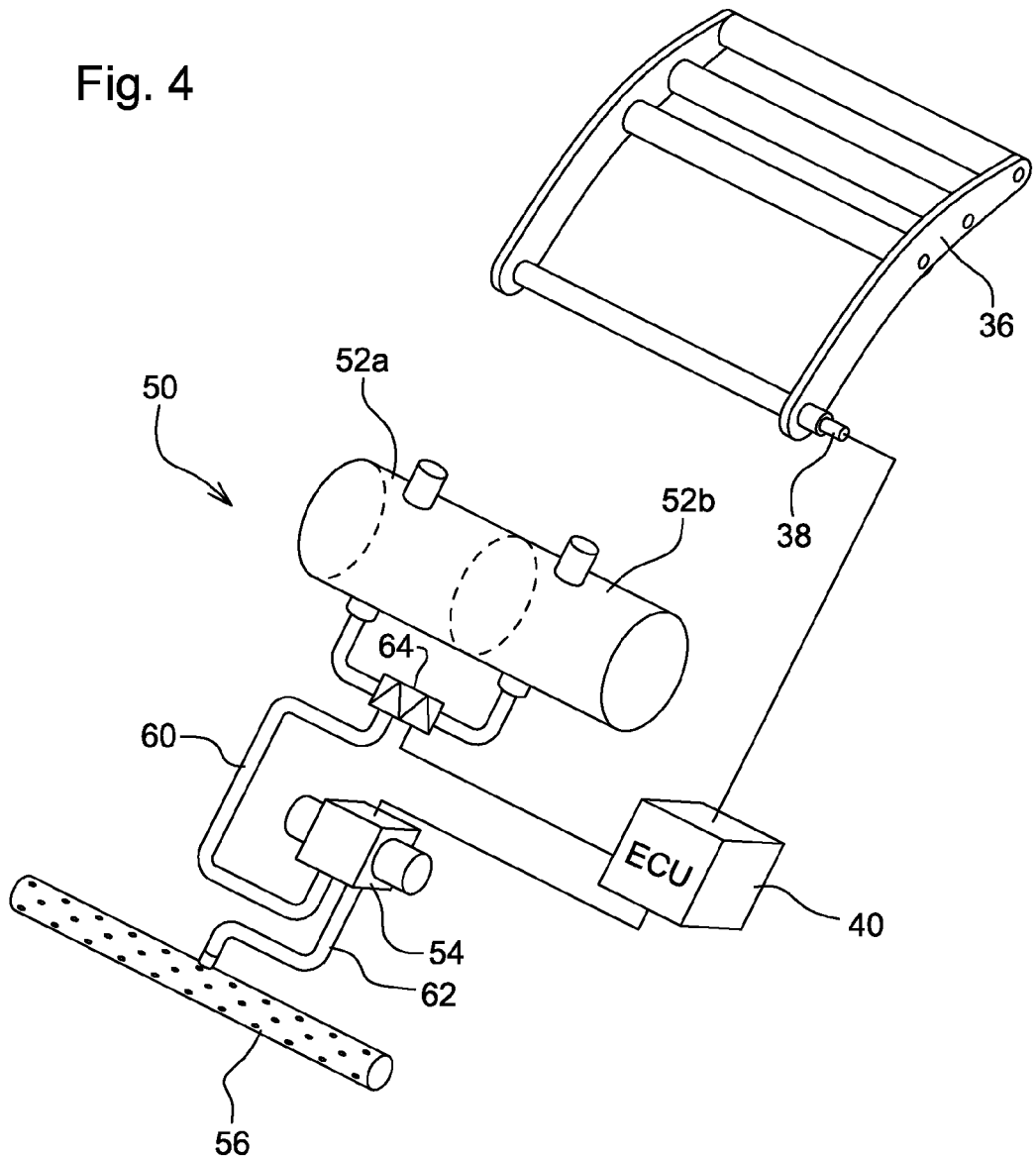
FIG. 4 is a perspective partially schematic view of a preservative application system according to the invention.

With continued reference to FIGS. 2 and 3 and also now to FIG. 4 it can be seen that the baler 14 further includes a preservative application system 50 that comprises at least one storage container such as holding tank 52, a transfer device such as variable speed pump 54 and an applicator device 56. It will be recognized as the description continues, that various alternative embodiments of the preservative application system are possible. For example the variable speed pump could be a fixed speed pump, or in place of a pump, the system could have a pressurized tank and valve system or a gravity feed and valve system. As illustrated the holding tank 52 and pump 54 are mounted upon a frame 58 above the tongue 20 at the front of the baler 10. It will, however, be recognized that the tank and pump could be mounted at another location. The applicator device 56 as shown is in the form of an elongated spray bar that generally spans the width of the baling chamber and is mounted just ahead of and above the crop inlet 44 of the baler. It will be recognized that instead of an elongated spray bar, the system could employ other means for applying the preservative such as nozzles having fixed or adjustable spray patterns. The tank 52 is connected to the pump 54 by way of a hose 60, and the pump 54 is, in turn, connected to the applicator device 56 by a hose 62. Thus, when the pump 54 is activated, preservative is drawn from the tank 52 via the hose 60 and sent to the applicator device 56 via the hose 62. Preservative is expelled from the spray bar in a pattern designed to ensure contact with the incoming crop material.

The ECU 40 is connected to and controls the pump 54 by way of appropriate logic to start and stop the pump 54 and/or to control the speed of the pump and therefore the application rate of the preservative. Logic can be programmed in the ECU 40 to start/stop and/or vary the speed of the pump 54 based upon the bale size data determined from the bale diameter sensor 38. It will be noted that while the preferred embodiment described herein utilizes an ECU to control a transfer device, it is contemplated that an ECU is not necessary to control a transfer device based upon bale size. For example it is conceivable to have a mechanical bale sensing lever that trips a switch or valve to start the delivery of preservative when the bale reaches a set diameter. Similarly it is conceivable to utilize an electric or electromechanical combination of controls wherein the bale sensor directly or indirectly triggers the application of preservative without requiring an ECU. In the preferred embodiment, the baler 14 fitted with the preservative application system 50, bale diameter sensor 38 and ECU 40 is drawn through the field and a baling operation is commenced in a known matter. As a bale is being formed the ECU 40 maintains the pump 54 in an "off" state such that no preservative is being applied to the crop at all. When the bale reaches a preselected diameter as determined by the ECU 40 from the bale diameter sensor data, the ECU 40 turns on the pump 54 and begins to apply preservative to the crop at a rate sufficient to fully treat the outer rind 12 of the bale 10. The rate at which the preservative is applied and the diameter at which application commences are preselected based upon the type of preservative being applied, the kind and condition of the crop, and the determination of the depth to which water is anticipated to penetrate the bale. The data concerning desired depth of preservative application, bale size etc. can be predetermined by the operator and programmed or entered into the ECU before baling operations commence. It is contemplated that an operator could select from a number of combinations of crop type, density, condition, and preservative type in the ECU. Accordingly, preservative is conserved and cost savings are realized by applying preservative only where it is needed, namely to the outer rind of the bale. The steps of this first embodiment of the method are illustrated in the flowchart of FIG. 5 wherein the baling operation commences at the start 501. At 502 the pump is in an "off" condition where no preservative is being applied. At 503 it is determined whether the bale has reached a predetermined size. If at 503, the answer is no, logic returns to 502. If at 503 the answer is yes then at 504 the pump is turned on to begin applying preservative to the crop. At 505 it is determined whether the bale is complete. If the bale is not yet complete the logic reverts to 504, if however, the bale is complete the pump is turned off at 506.

In another embodiment of the method when the baling operation commences the ECU turns on the pump at a first rate, preferably a slow rate at which a minimal amount of preservative is being applied to the crop as the bale is being formed. Then when the bale reaches the predetermined diameter the ECU increases the rate of application by the pump to a second, preferably heavier, rate so as to fully treat the outer rind of the bale. The steps of the above embodiment of the method are illustrated in the flowchart of FIG. 6 wherein the baling operation commences at the start 601. At 602 the pump is turned on and begins applying preservative to the crop at a first rate. At 603 a determination is made whether the bale has reached a predetermined size. If the bale has not yet reached the predetermined size the logic repeats step 603, if so then the pump speed and therefore the application rate is increased at 604. At 605 it is determined whether the bale is complete. If so the pump is turned off at 606, if not the logic reverts to step 605.

Figure 7:
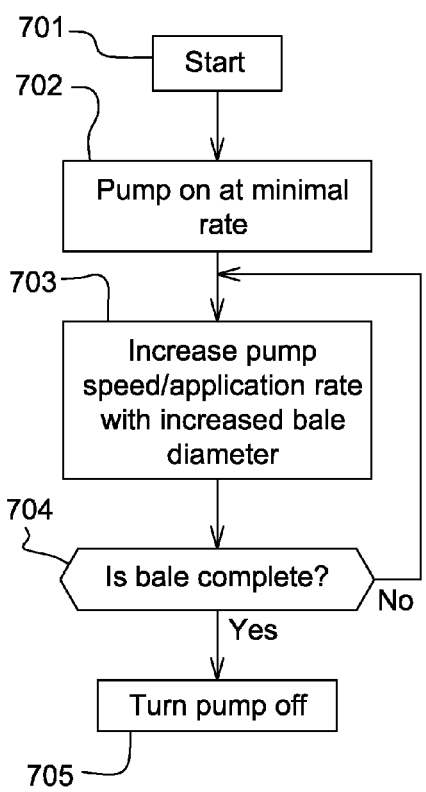
FIG. 7 is a flowchart showing the logic of another embodiment of the method.

In another embodiment the ECU controls the pump to apply preservative to the crop at a beginning rate when the bale is started and gradually increases the rate of application as the bale grows so that maximum application occurs to the crop at the outer rind of the bale. This embodiment is illustrated in the flowchart of FIG. 7 wherein the baling operation commences at the start 701. At 702 the pump is on at a minimal rate. At 703 the speed of the pump and therefore the application rate is increased commensurate with the increasing diameter of the forming bale. At 704 it is determined whether the bale is complete. If the bale is complete the pump is turned off at 705, if not the logic reverts back to 703.

Figure 8:
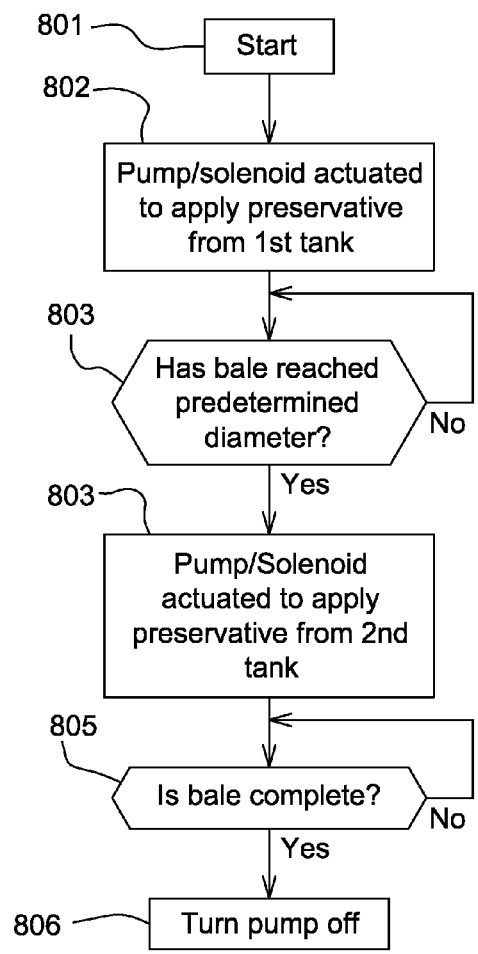
FIG. 8 is a flowchart showing the logic of another embodiment of the method.

In yet another embodiment of the method, the baler is provided with multiple tanks 52 or a tank having multiple chambers 52a and 52b, as shown in FIG. 4, for holding more than one type of preservative. Application of one type of preservative from one tank 52 or chamber 52a or 52b is controlled by actuation of both the pump 54 and a selection device such as solenoid valve 64 or the like. The solenoid valve 64 can be chosen to be a valve type that allows both tanks 52a and 52b to be turned off, both to be turned on, or to select between the two. It is also contemplated that the system could employ in addition to multiple tanks, multiple transfer devices such as pumps, and multiple applicator devices i.e. one set of tank, transfer device and applicator device for each type of preservative being applied. Accordingly, at the outset of the baling operation the ECU 40 initiates application of a first preservative to the crop as it enters the baler for bale formation and when the forming bale reaches a predetermined diameter actuates the pump 54 and solenoid valve 64 so as to initiate application of a second additional or different preservative to the outer rind of the bale. It should be recognized that the application of the different preservatives can occur at different rates depending on the type of preservative being employed. The logic of this embodiment of the method is illustrated in the flowchart of FIG. 8 wherein the baling operation commences at the start 801. At 802 the pump and solenoid valve are actuated to begin applying a first preservative to the crop from a first tank. At 803 it is determined whether the bale has reached a predetermined diameter. If the bale has not reached the predetermined diameter the logic reverts back to 803. If the bale has reached the predetermined diameter the pump and solenoid valve are actuated to begin applying a second preservative from a second tank at 804. At 805 it is determined whether the bale is complete. If the bale is not yet complete the logic again repeats step 805. If the bale is complete the pump and if necessary the solenoid valve are turned off and/or actuated to cease application of preservative to the crop at 806.

It is contemplated that due to a speed of the baling operation and/or density of the windrows of crop material to be baled, the rate at which the bale is growing within the bale chamber i.e. the thickness of material being added to the bale per each revolution of the bale within the chamber could exceed the desired depth for which it is desired to apply preservative. For example, if it has been determined that it is necessary to treat the outer three inches of a bale to protect the outer rind, and the diameter of the bale is growing by more than three inches per revolution, then more of the bale is being treated with preservative than is necessary, inasmuch as it is necessary to treat the final four inches of material in order to apply the preservative to the outer rind (three inches). Accordingly, preservative is being wasted. Thus another embodiment of the invention is to monitor not only bale diameter but also the rate at which the bale diameter is increasing. This can be accomplished by sensing revolutions of the bale in the chamber by any number of known means and determining in the ECU the increase in diameter per revolution. The ECU logic could then determine whether the increase in diameter per revolution (rate) exceeds the predetermined depth to which it is desired to apply preservative. If the predetermined depth is being exceeded per revolution then the ECU could initiate an automatic slowdown of the baling operation by slowing the prime mover or by other means such as by controlling a variable speed transmission of the baler. Alternatively, a signal can be made visually or audibly for the operator as an indication to slow the baling operation during preservative application. Thus only the outer rind of the bale is treated with preservative and waste of costly preservative is avoided. The above embodiment of the method is illustrated in the flowchart of FIG. 9 wherein the baling operation commences at 901. At 902 the pump is in an "off" state. At 903 the bale growth rate is monitored in the ECU based upon data from diameter and rotation sensors and the ECU determines whether the increase in bale diameter per revolution exceeds the predetermined depth to which it is desired to apply preservative. If at 903 the answer is yes, then at 904 the ECU provides a signal to the operator and/or slows the baler transmission or prime mover to adjust the baling speed, after which the logic reverts to 903 to continue monitoring baling rate. If at 903 the answer is no, then at 905 it is determined whether the bale has reached the predetermined diameter. If at 905 the answer is no, the logic reverts to step 903, if yes then at 906 the pump is turned on to begin applying preservative. At 907 it is determined whether the bale is complete. If the bale is complete the pump is turned off at 908, if not the logic reverts back to 906.

It is similarly contemplated that it could be desirable to vary the rate of application of preservative based upon the bale growth rate. For example the rate at which preservative is being applied can be increased commensurate with an increased bale growth rate and vice versa. The steps of this method are illustrated in the flowchart of FIG. 10 wherein the baling operation is commenced at 101. At 102 the pump is off. At 103 it is determined whether the bale has reached a predetermined diameter. If no, the logic reverts to 102, if yes, the growth rate of the bale is determined at 104 and at 105 the pump is turned on at a rate adjusted to the bale growth rate determined at 104. At 106 it is determined whether the bale is complete. If yes, the application pump is turned off at 107, if no, the logic reverts to 104 where the bale growth rate is again determined and the application rate readjusted (if necessary) at 105.

Having described the preferred embodiments it should now be apparent that alternatives are contemplated wherein the method and apparatus of the invention are utilized with either fixed or variable chamber round balers and can be utilized with both fluid and dry preservatives provided that appropriate storage, transfer and applicator devices suitable to the preservative are utilized.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A method of applying a preservative preparation to an agricultural crop during a baling process using a baler having a preservative application system and a bale size sensor, the method comprising the steps of:
   commencing a bale forming process to form a completed bale of the crop;
   monitoring a bale size during the bale forming process utilizing the bale size sensor to detect a predetermined diameter of the bale indicative of the bale forming process reaching an outer rind region of the bale which includes a depth of the crop extending from the predetermined diameter to an outer circumference of the completed bale; and
   controlling application of a preservative to the crop by the preservative application system in response to a sensed bale size indicated by the bale size sensor to adjust the application of the preservative to the crop upon the bale size sensor detecting that the bale size is at the predetermined diameter indicative of the bale forming process reaching the outer rind region of the bale.

2. A method according to claim 1 comprising the further step of actuating a transfer device of the preservative application system when the bale size reaches the predetermined diameter so as to commence application of the preservative to the crop.

3. A method according to claim 1 comprising the further step of changing from a first rate of application to a second rate of application when the bale size reaches the predetermined diameter.

4. A method according to claim 1 comprising the further step of continually increasing a rate of application as the sensed size of the bale increases.

5. A method according to claim 1 comprising the further step of selectively applying a first preservative followed by selectively applying a second preservative when the bale size reaches the predetermined diameter.

6. A method according to claim 1 comprising the further step of:
   determining a bale growth rate; and
   adjusting a rate of preservative application based upon the determined bale growth rate.

7. A method according to claim 6 comprising the further step of ceasing application of the preservative to the crop upon the sensed bale size reaching the outer circumference of the bale.

8. A method according to claim 1 comprising the further step of:
   determining a bale growth rate; and
   adjusting a speed of the bale forming process based upon the determined bale growth rate.

9. A method according to claim 8 wherein adjusting the bale forming speed results in a non-zero speed for the bale forming process.

10. A method according to claim 9 wherein the non-zero speed is determined based upon, at least in part, determining whether a current speed of the bale forming process results in an increase in bale diameter per revolution of the bale that exceeds a desired penetration depth for the preservative.

11. A method according to claim 10 comprising the further step of slowing the bale forming process when the bale diameter per revolution of the bale exceeds a desired penetration depth for the preservative.

* * * * *